Patented Mar. 20, 1951

2,545,702

UNITED STATES PATENT OFFICE 2,545,702

PROCESS FOR PREPARING STABLE POLYSTYRENE EMULSIONS

Forrest H. Norris, Springfield, Mass., assignor to Monsanto Chemical Company, St. Louis, Mo., a corporation of Delaware No Drawing. Application May 15, 1948, Serial No. 27,361

6 Claims. (Cl. 260—23)

This invention relates to synthetic resin suspensions. More particularly, the invention relates to stable aqueous suspensions of synthetic resins, processes for making said suspensions and particular dispersing agents for use therein.

Aqueous suspensions of synthetic resins are used in the surface coating and textile and paper impregnating fields. They comprise synthetic resins in a finely divided state dispersed throughout an aqueous medium. The suspensions generally contain a small amount of an agent acting to maintain the particles in suspension and to prevent them from settling to the bottom of the container.

Aqueous suspensions of synthetic resins may be made by dispersing finely divided resins in an aqueous medium containing a dispersing or suspending agent using mechanical agitation as a means for originally dispersing the resin particles. The suspensions may also be made by polymerizing an unsaturated monomer or plurality of such monomers in aqueous emulsion in the presence of dispersing or emulsifying agents. The products of the emulsion polymerization process are suspensions of solid resin particles in an aqueous medium containing a dispersing agent.

The dispersing agents used in prior processes either have produced unstable suspensions or when they produced stable suspensions have been seriously detrimental to the physical and chemical properties of the resin.

It is an object of this invention to provide stable synthetic resin suspensions.

A further object is to provide a process for producing stable synthetic resin suspensions.

Another object is to provide dispersing agents for synthetic resin suspensions which produce stable dispersions and do not adversely affect the chemical and physical properties of the resins.

These and other objects are attained by polymerizing unsaturated compounds in aqueous emulsions, using as a dispersing agent a combination of an ammonium or alkali metal salt of a vinyl ester-maleic anhydride copolymer and an ammonium or alkali metal salt of a long chain fatty acid.

The following examples are given in illustration and are not intended as limitations on the scope of this invention. Where parts are mentioned, they are parts by weight.

Example I 6 parts of a vinyl acetate-maleic anhydride copolymer prepared by copolymerizing approximately equimolar proportions of vinyl acetate and maleic anhydride were dissolved with constant agitation at 90° C. in 700 parts of water containing 8.4 parts of ammonia. There were then added 6 parts of oleic acid and the solution was refluxed at atmospheric pressure until the oleic acid was dissolved. To this solution was added 0.2 part of a silicone antifoaming agent to provide an aqueous medium suitable for emulsion polymerization.

To the aqueous medium thus prepared were added a mixture of 285 parts of monomeric styrene and 90 parts of butyl benzyl phthalate over a period of 15 minutes. The aqueous medium was maintained at reflux temperature at atmospheric pressure and constant agitation was provided throughout the addition of the styrene monomer. A solution comprising 0.4 part of potassium persulfate and 1 part of ammonium hydroxide in 40 parts of water was added to the aqueous medium in eight approximately equal portions over a period of about 2 hours. Refluxing at atmospheric pressure and constant agitation was maintained throughout the 2-hour period and continued thereafter until the reflux temperature rose to about 98–100° C. The reaction was then essentially complete and the product was cooled.

The product was a stable suspension of plasticized polystyrene, the particles of which were substantially all less than 5 microns in diameter. The conversion of monomer to polymer was approximately 99.5% complete. The suspension contained about 30% solids by weight, had a viscosity of about 3000 centipoises and a pH of about 9.5. It was stable to agitation for more than five minutes in a Waring Blendor.

One portion of the suspension was cast on a glass plate and the water was removed by evaporation. A transparent, elastic, tough and non-tacky film was obtained.

A further portion of the suspension was diluted to 20% solids with water. A glass fiber mat was immersed in the diluted suspension, removed and dried at 100° C. The resultant mat consisted of 72% by weight of plasticized polystyrene and 28% by weight of glass. The fibers were found to be thoroughly coated and bonded by the resin.

Example II

An aqueous emulsifying medium was prepared by dissolving 10 parts of sodium hydroxide and 6 parts of a vinyl acetate-maleic anhydride copolymer in 700 parts of water, adding thereto 6 parts of oleic acid, heating the solution at reflux temperature to dissolve the acid and finally incorporating 0.2 part of a silicone antifoaming agent.

To the aqueous medium thus prepared was added slowly a mixture of 285 parts of styrene monomer and 90 parts of butyl phthalyl butyl glycollate over a period of about 15 minutes while maintaining the aqueous medium at reflux temperature at atmospheric pressure and while providing continuous agitation. A solution comprising 0.4 part of potassium persulfate and 1 part of ammonium hydroxide in 40 parts of water was added to the aqueous medium in eight separate portions distributed evenly over a 2-hour period. Refluxing at atmospheric pressure and constant agitation was maintained during a 2-hour period and continued until the reflux temperature rose to 98–100° C. The reaction was then essentially complete and the reaction mixture was cooled.

The product was an aqueous suspension of polymerized styrene plasticized with butyl phthalyl butyl glycollate. The size of the polystyrene particles in the suspension was less than 5 microns. The conversion of the styrene monomer to the polymer was about 99.5% complete. The molecular weight of the polystyrene was greater than 150,000.

The suspension contained about 30% solids by weight, had a viscosity of 90 centipoises, a pH of 8.4 and was stable to agitation in a Waring Blendor for more than 5 minutes.

A film prepared from a portion of the suspension by casting onto a glass plate and evaporating the volatile matter at elevated temperature was clear, transparent and tough.

A portion of the suspension was diluted to 20% solids with water. A glass mat was immersed in the diluted suspension, removed and dried at about 100° C. The product was found to contain 50% resin by weight and the glass fibers were thoroughly coated and well bonded by the resin.

*Example III*

Example I was repeated except that the amount of vinyl acetate-maleic anhydride copolymer was reduced from 6 to 2 parts. The suspension produced was substantially identical with that of Example I except that the viscosity at 30% solids was 20 centipoises.

*Example IV*

Example III was repeated substituting stearic acid for oleic acid. The suspension obtained had a viscosity of 200 centipoises at 30% solids, a pH of 8.5, and was stable for more than 5 minutes to agitation in a Waring Blendor. A film cast from the suspension was clear, transparent, tough and elastic.

When suspensions were made by similar methods by using ammonium oleate, a sodium sulfonate of alkyl benzenes or a commercial soap without the vinyl acetate-maleic anhydride copolymer salt, the suspensions were unstable to agitation, had viscosities of less than 30 centipoises, produced weak, tacky films and showed less than 30% resin pickup on glass fiber mats based on the weight of the glass fibers. When salts of vinyl acetate-maleic anhydride copolymers were used as the sole dispersing agents it was found substantially impossible to produce suspensions stable to agitation.

The vinyl ester-maleic anhydride copolymers to be used are made by copolymerizing a vinyl ester of a lower aliphatic acid such as vinyl formate, vinyl acetate, vinyl propionate, vinyl butyrate, vinyl valerate, etc., with maleic anhydride or maleic acid by conventional polymerization processes, such as mass, solution, suspension or emulsion methods. The mol ratio of vinyl ester to maleic anhydride may be varied from 1:9 to 9:1. In a preferred embodiment of the invention, the mol ratio may be varied between 1:1 and 2.5:1.

A specific example of one method for preparing a specific copolymer is to mix 1 mol of vinyl acetate with 1 mol of maleic anhydride and about 1% by weight of benzoyl peroxide in a suitable container. The mixture may then be heated at from 40–200° C. to obtain a solid polymer. The solid may then be pulverized and dissolved in water made alkaline with ammonia or an alkali metal hydroxide.

In a further embodiment of the invention the maleic anhydride may be partially esterified with an alcohol and the partial ester copolymerized with the vinyl ester. For esterification purposes, aliphatic alcohols having from 1 to 20 carbon atoms are preferred. Best results are obtained when the maleic anhydride is esterified to the extent of from about 5% to about 25%. The copolymerization of the partial esters of maleic anhydride with the vinyl ester may be carried out by conventional mass, suspension, emulsion and solution methods.

The amount of vinyl ester-maleic anhydride copolymer salt may be varied from about 0.1 to about 5%, based on the monomer. By varying the amount of the copolymer salt within otherwise identical formulations, the viscosity of the suspensions may be controlled as shown by Examples I and III, wherein 6 parts of vinyl acetate-maleic anhydride copolymer per 285 parts of styrene monomer gave a suspension having a viscosity of 3000 centipoises at 30% solids (Example I) where as the viscosity was only 20 centipoises at 30% solids when the amount of vinyl acetate-maleic anhydride copolymer was reduced to 2 parts (Example III). The viscosity control due to the copolymer may be further extended to cover a range of from about 10 to about 4000 centipoises.

The viscosity of the suspensions is also affected by the plasticizer used and by the alkali used as shown in Example II.

The long chain fatty acid salt used as the second dispersing agent may be an ammonium or alkali metal salt of a saturated or unsaturated aliphatic acid containing from about 12 to about 20 carbon atoms. Among the salts which may be used are the ammonium, lithium, sodium, potassium, rubidium and cesium salts of such acids as lauric, stearic, palmitic, oleic, myristic, ricinoleic, etc. acids. It is preferable, although not necessary, that the cation used should be the same for both dispersing agents. The amount of long chain fatty acid salt used may vary from about 0.1 to about 5% based on the polymerizable monomer. A preferred range is from 2–3%.

The method of addition of the two dispersing agents may be varied. The acid and copolymer may be added to the aqueous phase containing the hydroxide of the desired cation. The salts may be prepared separately and then added to the aqueous phase. The copolymer may be added to the aqueous phase containing the desired base and the acid may be mixed with the monomer prior to its addition to the aqueous phase.

In place of the styrene shown in the examples, other polymerizable monomers or a plurality of polymerizable monomers may be used. To be effectively polymerized in aqueous emulsions, the polymerizable unsaturated monomer should be substantially insoluble in water, i. e., it should be no more than about 7% soluble.

Examples of the monomeric materials which may be used are: vinyl aromatic hydrocarbons and their substitution products such as styrene, p-methyl styrene, p-ethyl styrene, α-methyl styrene, monochlorostyrene, polychlorostyrenes, nitrostyrenes, vinyl naphthalene, vinyl diphenyl, divinyl benzene; vinyl esters, ethers and amides, including vinyl acetate, methyl vinyl ether, ethyl vinyl ether, etc.; acrylic and α-substituted acrylic acid derivatives including their esters, amides, nitriles such as the alkyl esters of acrylic acid, methacrylic acid, chloracrylic acid, phenyl acrylic acid, methacrylamide, acrylonitrile, methacrylonitrile; derivatives of α-β-unsaturated dibasic acids such as the esters, amides and nitriles of maleic, fumaric, itaconic, citraconic, mesaconic, etc. acids; allyl derivatives; vinylidene compounds, dienes, isoolefines, etc. Two or more of the unsaturated monomers may be copolymerized by the process of this invention.

The films produced from the suspensions made according to this invention vary in toughness, hardness and other physical properties according to the monomer or monomer mixture used. It may be desirable to plasticize some of the resins such as polystyrene. It has been found advantageous and practical to incorporate the plasticizer in the emulsion along with the monomer. Any of the known water-insoluble plasticizers may be used in proportions to be determined by the degree of softness required. Butyl benzyl phthalate and butyl phthalyl butyl glycollate are shown in the examples. Other plasticizers such as esters of phthalic, succinic, sebacic, adipic, citric, aconitic, phosphoric acids, aromatic hydrocarbons, chlorinated diphenyls, may be used or a mixture of plasticizers may be used.

The polymerization catalysts shown may be replaced by other water-soluble catalysts including hydrogen peroxide, perborates, persulfates, etc. The amount of catalyst may be varied from about 1 to about 5% based on the monomer.

Other conventional additives such as dyes, pigments, natural or synthetic resins, lubricants, waxes, etc. may be added to the emulsions either prior to or subsequent to the polymerization reaction.

The polymerization reaction may be varied in several ways. The monomer or monomer mixture may be added in toto to the aqueous phase prior to polymerization or it may be added continuously to the aqueous phase over a period of from 10 minutes to 4 hours or more. In the latter event polymerization will start with the first addition of monomer and will be continued for a varying period of time after the monomer has been entirely added.

The catalyst may be added in toto to the aqueous phase, continually, over the same period of time as the monomer, or batchwise at intervals during the polymerization of the monomer. It is preferable to dissolve the catalyst in water and add it to the polymerization reaction as an aqueous solution.

The temperature of the polymerization reaction may be varied. For the most rapid polymerization, the reaction medium may be refluxed at atmospheric temperature. However, the temperature may be from 20 to 50 degrees centigrade lower than reflux temperature if desired.

To produce an emulsion, the reaction ingredients must be agitated throughout the reaction. Using the specific combination of dispersing agents of this invention, the rate of agitation is not critical. Using an anchor type of stirrer, the R. P. M. may vary from less than 50 to more than 200. The rate of agitation will be determined by type of agitating means, batch size, reaction vessel design, foaming properties of the reactants, temperature, etc.

For styrene emulsion polymerization, the pH of the reaction should be at least 9. It may be controlled by the use of pH regulators or buffers. For other monomers and monomer mixtures, other pH ranges may be desirable. In general, the pH of the emulsion polymerization and the final suspension should not be below 8.

Using the dispersing agents of this invention, the solids content of the final suspension may be varied from about 1 to about 60%. For practical applications, the solids content will vary from about 10 to about 40%. The final suspensions may be diluted with water to an infinite extent, e. g., even until a specific gravity of approximately 1 is obtained, without breaking the suspension.

The suspensions of this invention may be made into tough continuous films by casting them on a smooth surface such as glass or polished steel. They may be sprayed by conventional means such as an ordinary spray gun to coat or impregnate various materials such as glass, wood, metals, paper and fabrics, or they may be applied to these materials by other means such as roll-coating, dipping, etc.

The combination of dispersing agents of this invention permits the production of stable suspensions of polymers and copolymers by the emulsion polymerization process. The viscosity of the suspensions may be varied as required. Films prepared from the suspensions are stronger and tougher than films made from suspensions in which other dispersing agents were used or from suspensions made from the resin after polymerization. Furthermore, when used as impregnating agents for fabrics such as glass fiber mats, the retention of resins from the suspensions of this invention is exceptionally high.

It is obvious that many variations may be made in the products and processes of this invention without departing from the spirit and scope thereof as defined in the appended claims.

What is claimed is:

1. A process for preparing stable suspensions which comprises polymerizing 100 parts of styrene with substantially constant agitation in an aqueous medium comprising a water solution containing from 0.1 to 5 parts of a compound taken from the group consisting of ammonium and alkali metal salts of a copolymer of a vinyl ester of a lower aliphatic acid and maleic anhydride and from 0.1 to 5 parts of a compound taken from the group consisting of ammonium and alkali metal salts of monocarboxylic aliphatic acids containing from 12 to 20 carbon atoms.

2. A process as in claim 1 wherein the vinyl ester is vinyl acetate.

3. A process as in claim 1 wherein the $C_{12}$–$C_{20}$ aliphatic acid is oleic acid.

4. A process for preparing stable suspensions which comprises polymerizing 100 parts of a mixture of styrene and an unsaturated water-insoluble compound polymerizable therewith with substantially constant agitation in an aqueous medium comprising a water solution containing from 0.1 to 5 parts of a compound taken from the group consisting of ammonium and alkali metal salts of a copolymer of maleic anhydride and a vinyl ester of lower aliphatic acids and from 0.1 to 5 parts of a compound taken from the group consisting of ammonium and alkali metal salts of monocarboxylic aliphatic acids containing from 12 to 20 carbon atoms.

5. A process for preparing stable suspensions which comprises polymerizing 100 parts of a mixture of styrene and a plasticizer therefor with substantially constant agitation in an aqueous medium comprising a water solution containing 0.1 to 5 parts of a compound taken from the group consisting of ammonium and alkali metal salts of a copolymer of maleic anhydride and a vinyl ester of a lower aliphatic acid and from 0.1 to 5 parts of a compound taken from the group consisting of the ammonium and alkali metal salts of monocarboxylic aliphatic acids containing from 12 to 20 carbon atoms.

6. A process for preparing stable suspensions which comprises polymerizing 100 parts of styrene with substantially constant agitation in an aqueous medium comprising from 0.1 to 5 parts of ammonium oleate and the ammonium salt of a vinyl acetate-maleic anhydride copolymer.

FORREST H. NORRIS.

REFERENCES CITED

The following references are of record in the file of this patent:

UNITED STATES PATENTS

| Number | Name | Date |
|---|---|---|
| 1,976,679 | Fikentscher et al. | Oct. 9, 1934 |
| 2,300,566 | Hahn et al. | Nov. 3, 1942 |
| 2,388,600 | Collins | Nov. 6, 1945 |
| 2,473,929 | Wilson | June 21, 1949 |

OTHER REFERENCES

Brajnikoff Plastics (London), pages 230–238, July 1942.